G. M. JOHNSON.
SAFETY HORN BLOCK.
APPLICATION FILED AUG. 27, 1919.

1,372,753.

Patented Mar. 29, 1921.

WITNESS
R. F. Dilworth

INVENTOR.
George M. Johnson
By Jas. R. Singer
Attorney

UNITED STATES PATENT OFFICE.

GEORGE M. JOHNSON, OF McDONALD, PENNSYLVANIA.

SAFETY-HORN BLOCK.

1,372,753.  Specification of Letters Patent.  Patented Mar. 29, 1921.

Application filed August 27, 1919. Serial No. 320,089.

*To all whom it may concern:*

Be it known that I, GEORGE M. JOHNSON, a citizen of the United States, residing at McDonald, in the county of Washington and State of Pennsylvania, have invented certain new and useful Improvements in Safety-Horn Blocks, of which the following is a specification.

This invention relates to safety horn blocks for use in connection with mine cars for locking the same on a track leading to the mine shaft or upon a mine cage when run thereon, or upon a chain hoist, and has for its object to provide a block of such class, in a manner as hereinafter set forth, for securely locking the car from movement when desired to arrest the movement thereof on a chain hoist to prevent damage to cars and track, and further to provide means associating with the block for cushioning the block when impacted upon by the wheel of the car whereby the life of the block is increased and damage to the tread of the wheel reduced to a minimum.

A further object of the invention is to provide a safety horn block, in a manner as hereinafter set forth, having means to enable the oscillation thereof for the purpose of moving the block to and from operative position to lock or release the car wheel and further to provide a clearance for the hub of the car wheel when desired.

Further object of the invention is to provide a safety horn block in a manner as hereinafter set forth including a body portion with a pair of extensions to form a pair of working surfaces for gripping the wheel tread to securely maintain the wheel in locked position.

Further objects of the invention are to provide an oscillatory cushioned safety horn block which is simple in its construction and arrangement, strong, durable, efficient and convenient in its use, readily set up and comparatively inexpensive to manufacture.

With the foregoing and other objects in view this invention consists of the novel construction, combination and arrangement of parts as hereinafter more specifically described and illustrated in the accompanying drawings, wherein is shown an embodiment of the invention but it is to be understood that changes, variations and modifications can be resorted to which come within the scope of the claims hereunto appended.

In the drawings wherein like reference characters denote corresponding parts throughout the several views:

Fig. 4 is a top plan.

Figure 1:
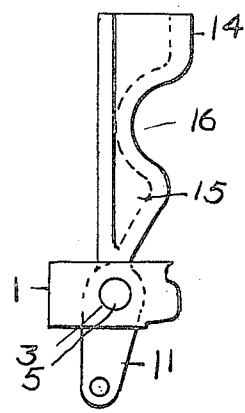
Figure 1 is a front elevation of a safety horn block in accordance with this invention.
Figure 2:
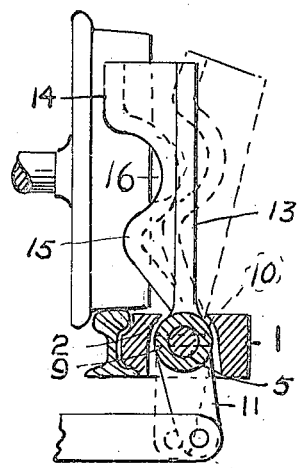
Fig. 2 is a like view showing the adaptation of the block in full and in dotted lines in connection with the car wheel.
Figure 3:
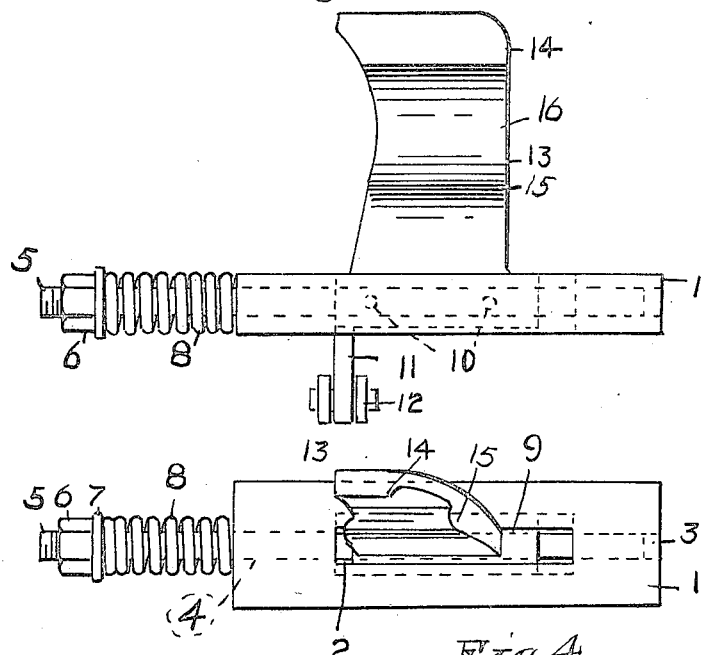
Fig. 3 is a side elevation.

Referring to the drawings in detail 1 denotes a rectangular support which is maintained stationary in any suitable manner and is formed with a centrally disposed rectangular slot or opening 2. Centrally of the support 1 at one end a longitudinal bore 3 is arranged which opens into one end of the slot 2. Centrally of the support 1 and at the other end thereof a longitudinal bore 4 is arranged which opens into the other end of the slot 2.

Slidably mounted in the bores 3, 4, and extending across the slot 2, as well as projecting from the bore 4, is a slide rod 5, which carries on its outer end an adjustable nut 6, and a washer 7.

Mounted upon the rod 5, and interposed between the washer 7, and the support 2, is a coiled cushioning spring 8.

Arranged within the slot 2, is a base 9, of a safety horn block. The base 9, is formed with an opening through which extends the rod 5, and the latter is fixedly secured to the rod 5, by hold-fast devices 10. Depending from the forward end of the base 9, is a crank 11, connected as at 12 with means for oscillating the base, and as the base is fixed to the rod 5, the latter will shift therewith.

Formed integral with the base 9, is an upright arm 13, having a pair of extensions 14, 15, extending inwardly with respect to the arm 12, and at an angle thereto.

The extensions 14, 15, are spaced by a concave offset 16, which provides a clearance for the outer end of the axle 17, of the wheel 18.

The inner face of the extensions 14, 15, are concave but disposed at an angle with respect to the concavity 16, and said inner face of the extensions 14, 15, provide a pair of working surfaces which are adapted to abut against the tread of the wheel for locking the same from movement.

The extension 14, is of greater length than the extension 15, so that a greater binding action will be had near the top of the wheel thereby securely locking the same when the horn block is in operative position. The base 9, is of less length than the slot 2, thereby providing for the sliding movement of the rod 9, when the extensions 14, 15, are impacted upon by the wheel. The sliding movement of the base which carries the rod 5, therewith is against the action of the spring 8, under such conditions a cushioning action is set up for the block when impacted upon by the wheel.

What I claim is:

1. A safety horn block comprising a slidable and oscillatory cushioned rod, a support therefor, and a block element extending into the support and fixed to said rod and oscillating and sliding with the rod, said block element having a pair of working surfaces for engaging the tread of a wheel to arrest travel thereof.

2. A safety horn block comprising a slidable and oscillatory cushioned rod, a support therefor, and a block element extending into the support and fixed to said rod and oscillating and sliding with the rod, and an arm depending from said element, said block element having a pair of working surfaces for engaging the tread of a wheel to arrest travel thereof.

3. A safety horn block comprising a slidable oscillatory cushioned rod, a support therefor, and a block element extending into the support and fixed to said rod and oscillating and sliding with the rod, said block element having a pair of working surfaces for engaging the tread of a wheel to arrest travel thereof, and said block element further having a concavity between said working surfaces to provide a clearance for the hub of the wheel.

4. A safety horn block comprising a slidable and oscillatory cushioned rod, a support therefor, and a block element extending into the support and fixed to said rod and oscillating and sliding with the rod, and an arm depending from said element, said block element having a pair of working surfaces for engaging the tread of a wheel to arrest travel thereof, and said block element further having a concavity between said working surface to provide a clearance for the hub of the wheel.

In testimony whereof I affix my signature.

GEORGE M. JOHNSON.